United States Patent [19]

Thach

[11] Patent Number: 5,529,122
[45] Date of Patent: Jun. 25, 1996

[54] METHOD FOR ALTERING FLOW PROFILE OF A SUBTERRANEAN FORMATION DURING ACID STIMULATION

[75] Inventor: Sophany Thach, Dallas, Tex.

[73] Assignee: Atlantic Richfield Company, Los Angeles, Calif.

[21] Appl. No.: 356,608

[22] Filed: Dec. 15, 1994

[51] Int. Cl.$^6$ ...................................... E21B 43/27
[52] U.S. Cl. .................. 166/281; 166/307; 166/309; 507/202; 507/205; 507/211; 507/261
[58] Field of Search ..................... 166/281, 294, 166/307, 309; 507/202, 205, 211, 261

[56] References Cited

U.S. PATENT DOCUMENTS

| | | |
|---|---|---|
| 3,410,344 | 11/1968 | Cornelius . |
| 3,583,483 | 7/1969 | Foote ........................ 166/250 |
| 3,612,179 | 7/1969 | Anderson ................. 166/307 X |
| 3,612,182 | 8/1969 | Raifsnider et al. ............. 166/307 |
| 4,235,734 | 11/1980 | Scherubel ................. 507/202 X |
| 4,440,653 | 4/1984 | Briscoe et al. ............. 507/202 X |
| 4,612,991 | 9/1986 | Shaw .......................... 166/273 |
| 4,732,690 | 3/1988 | Shaw . |
| 4,796,702 | 1/1989 | Scherubel ................. 166/309 x |
| 4,836,281 | 6/1989 | Robin et al. ............... 166/309 X |
| 5,074,358 | 12/1991 | Rendall et al. ............ 166/309 X |
| 5,296,164 | 3/1994 | Thach et al. ................. 252/307 |
| 5,346,008 | 9/1994 | Sydansk .................... 166/309 X |
| 5,392,859 | 2/1995 | Adams et al. ............. 166/309 X |

OTHER PUBLICATIONS

"Mobility Control Using $CO_2$ Forms (sic)"; S. H. Yang et al; SPE 19689 (Society of Petr. Engr); San Antonio, TX; Oct. 8–11, 1989.

"Applying Fractional–Flow Theory to Foams for Diversion in Matrix Acidization" Z. H. Zhou et al; SPE 24660; Washington, DC Oct. 4–7, 1992.

*Primary Examiner*—George A. Suchfield
*Attorney, Agent, or Firm*—Drude Faulconer

[57] ABSTRACT

A method for acidizing a subterranean formation wherein a specific foam is used to block flow through the higher-permeable zones of the formation while the acid is being injected therein. The foam is generated from a surfactant solution comprised of a blend of surfactants comprised of a nonionic primary surfactant (e.g. ethoxylated alcohol or polyglycosides) a cationic co-surfactant (e.g. fluorinated quaternary ammonium chloride). A polymer (e.g. polysaccharides or partially hydrolyzed polyacrylamide) may be added to the surfactant solution to enhance the foam mobility reduction and a co-solvent (e.g. polyol) may be added if necessary to maintain the surfactant/polymer complex in solution.

10 Claims, 6 Drawing Sheets

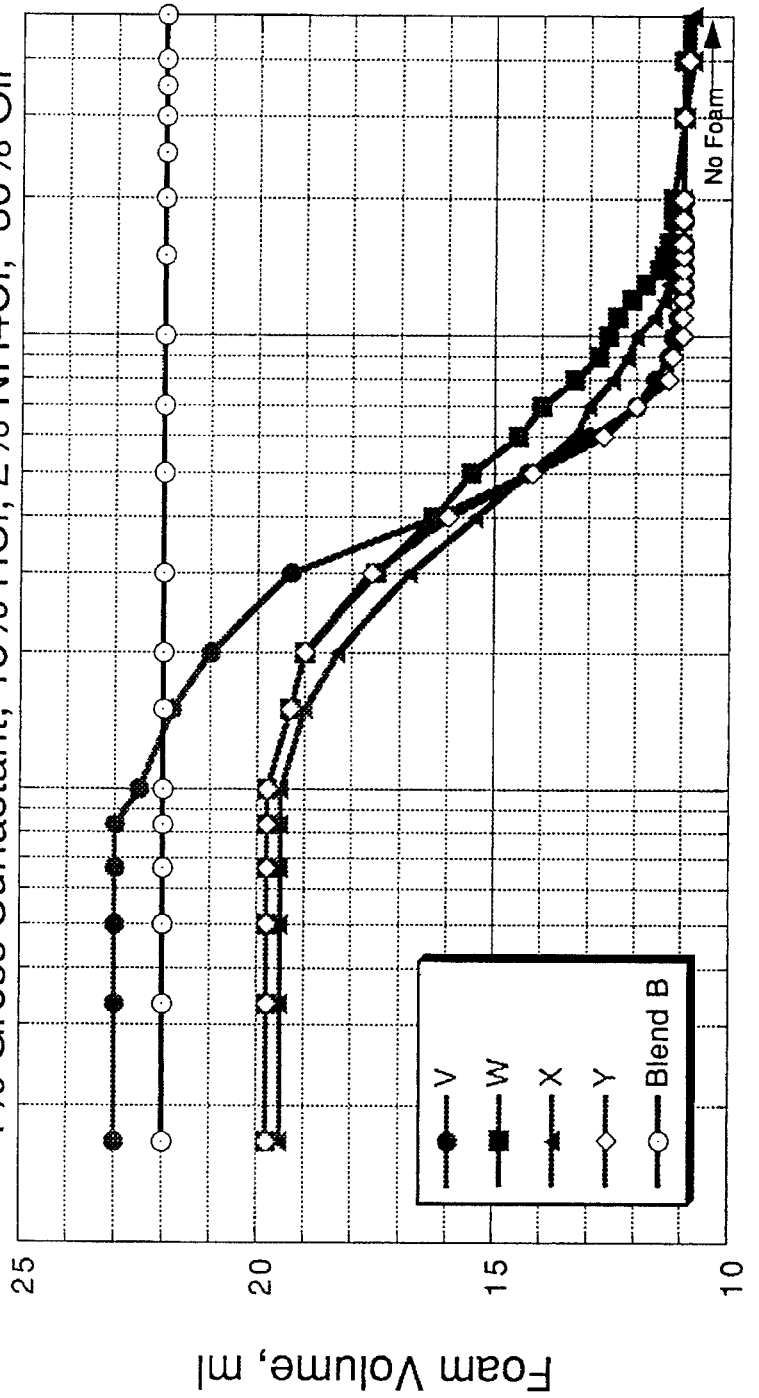

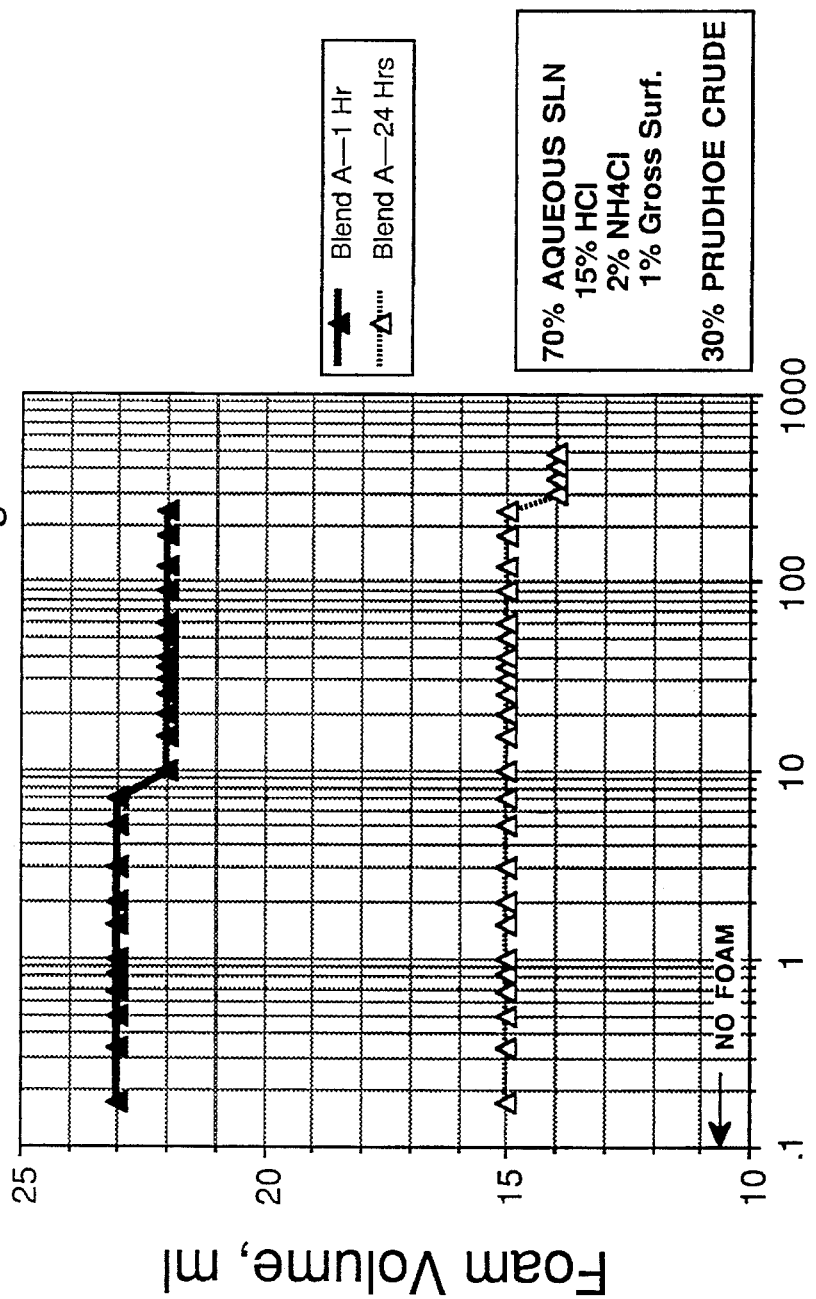

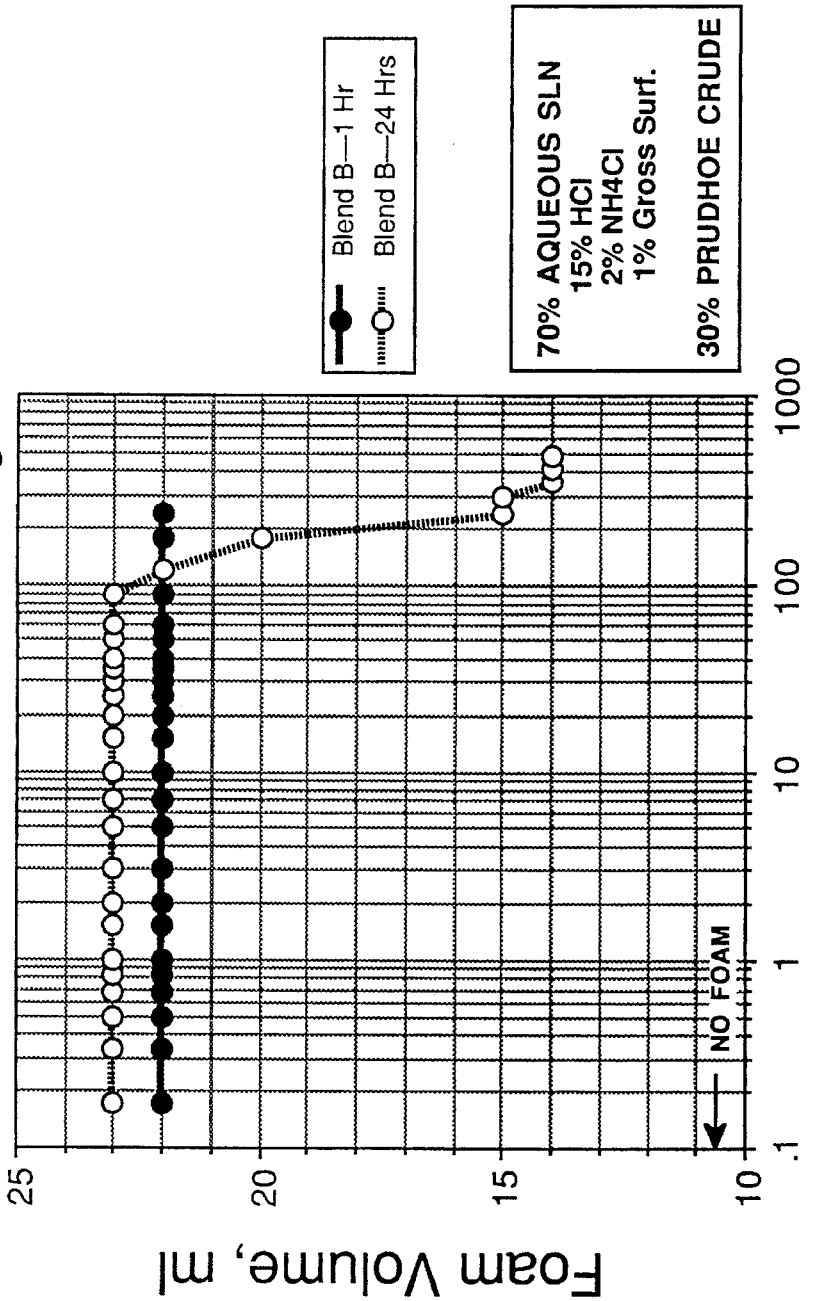

METHOD FOR ALTERING FLOW PROFILE OF A SUBTERRANEAN FORMATION DURING ACID STIMULATION

DESCRIPTION

1. Technical Field

The present invention relates a method for altering the flow profile of a subterranean formation during acid stimulation and in one of its aspects relates to a method using a specific foam formulation to block flow through the more permeable channels of a formation during the injection of an acid into the formation.

2. Background Art

Often a near-wellbore region of a subterranean formation is damaged during the drilling and/or completion of a well through the formation or after a prolonged well operation. Such damage, if remained untreated, may result in a substantial loss in the productivity/injectivity of fluids out from or into the damaged formation. One method which has been used for treating such regions to improve the permeability of the damaged region involves stimulating the damaged region with a concentrated acid solution (e.g. a 15% hydrochloric acid solution, an aqueous mixture of hydrochloric and hydrofluoric acids, or the like).

Unfortunately, when the acid solution is injected into the formation, fractures and/or high-permeability zones adjacent to or within the damaged region may draw the acid away from the less-permeable damaged region, thereby substantially reducing the efficiency of the acidization operation. Therefore, to insure that a substantial amount of the acid solution will flow into the less-permeable damaged region, it may be necessary to temporarily alter the flow profile through the formation by blocking any substantial flow through the more-permeable channels in the formation before and during the injection of the acid into the damaged region.

Typically, the flow profile of a formation is altered by injecting a blocking agent into the formation prior to or along with the acid wherein the blocking agent takes the path of least resistance and flows into the more-permeable zones of the formation. The blocking agent sets up in these more-permeable zones to block further flow therethrough which, in turn, forces the following acid into the areas of the formation which are to be treated, i.e. the lower-permeable zones of the damaged region.

While several types of blocking agents (e.g. resin, gels, etc.) have been proposed for this purpose, one of the more commonly-used blocking agents is one which is collectively referred to as "foam". For a foam to be fully effective as a blocking agent, it must have the following characteristics:

First, the foam must be "acid-resistant". That is, the foam must be stable in the presence of a high-concentration acid (e.g. 15% hydrochloric acid). That is, if the foam collapses upon contact with the acid, the flow passages in the higher-permeable zones will no longer be blocked by the foam whereby the injected acid will merely invade these higher-permeable zones rather than being forced into the lower-permeable zones as required for a fully successful acidizing operation.

Second, the foam must be "oil-resistant". That is, the foam must be stable in the presence of crude oil where the crude oil is near or at relatively high, residual saturations (e.g. less than 30%) since residual crude oil is always present even in well-swept zones of the formation being treated; although it may be at lower saturations. Third, the foam must be capable of producing a stiff foam that is substantially less mobile (e.g. at least 100 times) than gas in order to block the flow of the acid.

Lastly, the foam must maintain its flow-blocking capabilities (i.e. stiffness) during the injection period of the acid after which time, the foam should inherently break down to once again allow flow through the higher-permeable zones. Foams endowed with these properties will effectively restrict flow into the higher-permeable channels near the wellbore, thus diverting most of the acid into the lower-permeable zones where it is most needed.

A wide range of different types of surfactants have been proposed for generating foams which, in turn, have been proposed for use as blocking agents in the acidizing of a subterranean formation. These surfactants include anionic, cationic, amphoteric, and nonionic surfactants, in increasing order of performance. Anionic surfactants are adversely affected by the presence of crude oils and severely deteriorate in the presence of strong acids such as hydrochloric acid. Cationic surfactants are moderately good foamers in the presence of acid, but produce unstable foams in the presence of crude oils. The same is true of amphoteric surfactants. Nonionic surfactants foam well initially but the life of these foams in the presence of acids and crude oils remains too short for acidizing operations.

DISCLOSURE OF THE INVENTION

The present invention provides a method for acidizing a subterranean formation wherein a specific foam is used to block flow through the higher-permeable zones of the formation while the acid is being injected therein. More specifically, the present invention uses foams generated from formulations which produce foams which are (1) stable in the presence of a high-concentration acid—e.g. 15% hydrochloric acid; (2) stable in the presence of crude oil near the residual saturation of the formation—typically less than 30%; (3) capable of producing a stiff foam that is at least 100 times less mobile than gas; and (4) effectively broken down at the end of the acidizing operation to allow back-flow from the formation.

In accordance with the present invention, a surfactant solution comprising a blend of surfactants and a brine is used to generate the foam used in the invention. The blend of surfactants is comprised of a nonionic surfactant (e.g. ethoxylated alcohol or polyglycosides) which give high foam and insensitivity to acid and a fluorinated cationic surfactant (e.g. fluorinated quaternary ammonium chloride) which gives good oil resistance. The concentration of the primary surfactant in the surfactant solution is from about 0.1 wt % to about 2 wt % while the concentration of the co-surfactant is from about 5 to about 20 less than that of the primary surfactant.

A polymer (e.g. polysaccharides or partially hydrolyzed polyacrylamide) may be added to the surfactant solution in concentrations of from about 175 to about 1600 ppm to enhance the foam mobility reduction beyond that of the surfactants alone. Further, a co-solvent (e.g. polyol) may be added to the surfactant solution if necessary to maintain the surfactant/polymer complex in solution.

In carrying the acidizing method of the present invention, the foam generated from the surfactant solution is injected into the formation where it flows into the higher-permeable zones of the formation to block further flow therethrough. Next, an acid (e.g. 15% hydrochloric acid) is injected and is diverted by the foam into the lower-permeable zones of the formation where it is needed.

BRIEF DESCRIPTION OF THE DRAWINGS

The actual operation and apparent advantages of the present invention will be better understood by referring to the following graphs in which like letters identify like foams in the various graphs and in which:

FIG. 4 is a graph showing the foaminess and foam stability of various foams formulated from alkyl phenol ethoxylate surfactants and comparing these foams to a foam formulated in accordance with the present invention;

FIG. 5 is a graph showing the effects that different mixing periods between the foaming solution and acid have on the volumes of a foam formulated in accordance with the present invention; and FIG. 6 is a graph showing the effects that different mixing times have on the volumes of a different foam formulated in accordance with the present invention.

BEST KNOWN MODE FOR CARRYING OUT THE INVENTION

Figure 1:
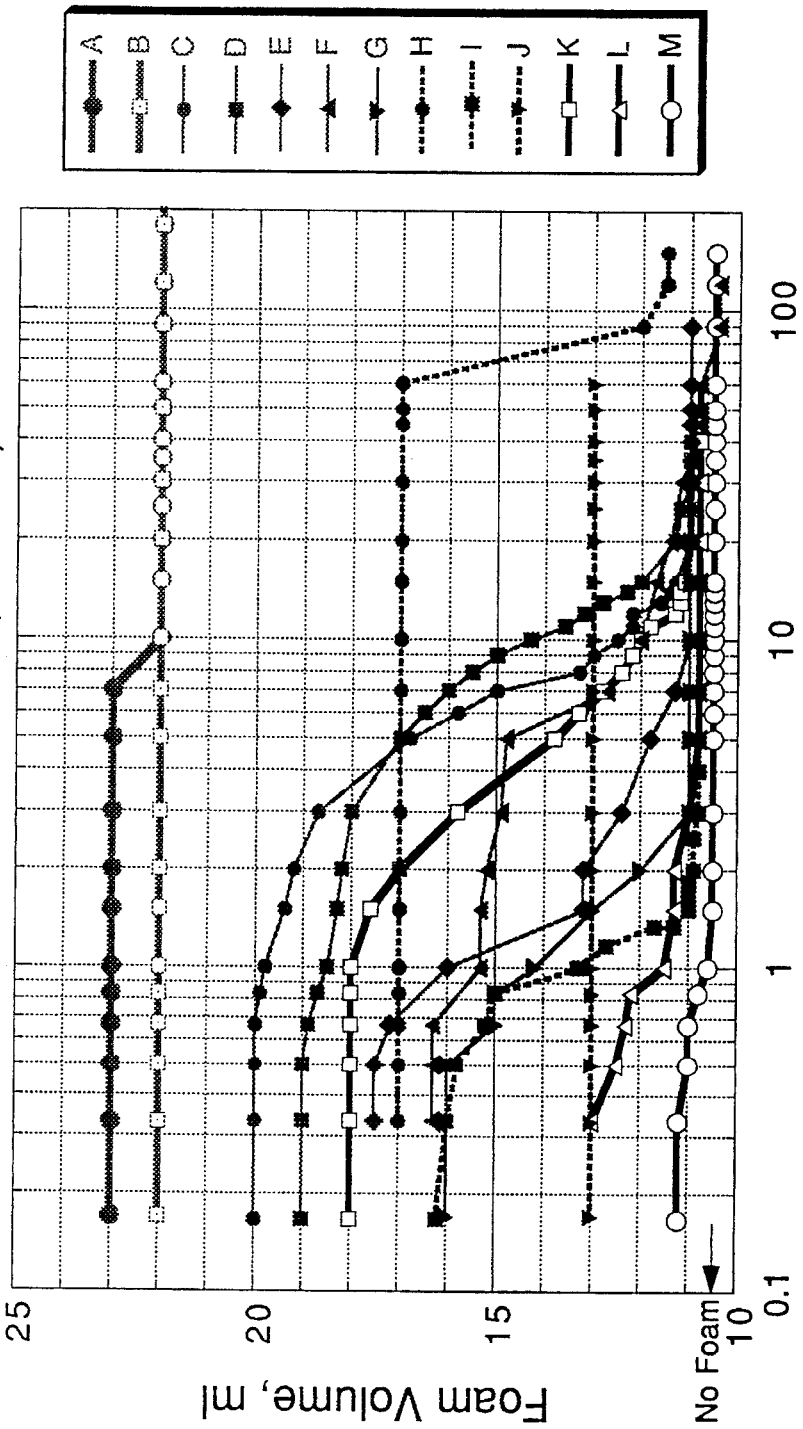
FIG. 1 is a graph showing the foaminess and foam stability of various foams formulated from certain commercial surfactants and comparing these foams to those formulated in accordance with the present invention.

Damage to the near-wellbore region of a formation may be caused during the drilling and/or completion of the well which transverses that formation or after prolonged well operation. As used herein, "well" refers to any well which may be used in the production of fluids from or the injection of fluids into a subterranean formation. The damage to the near-wellbore region normally results in a substantial loss in the productivity/injectivity of the well.

One method for treating such damaged regions involves injecting a concentrated acid (typically a 15% hydrochloric acid solution, etc.) into the damaged region to restore at least some of its lost permeability. However, fractures or higher-permeable zones within or adjacent to the damaged region can divert the flow of acid away from the damaged region. To prevent the acid from merely flowing into the higher-permeable zones of the region to be treated, a blocking agent (i.e. "foam") is injected prior to or with the acid. The foam flows into the higher-permeable zones to block further flow therethrough thereby forcing the following acid solution into the lower-permeable zones to be acidized.

The foam and acid solution can be injected into the formation in various sequences. One such sequence is disclosed in the Society of Petroleum Engineers' paper SPE 24660 by A. H. Zhou and W. R. Rossen and entitled: "Applying Fractional-Flow Theory to Foams for Diversion in Matrix Acidization", which was presented in Washington, DC, Oct. 4–7, 1992. The disclosed sequence is basically injecting (1) a brine slug (e.g. 1–2% ammonium chloride); (2) a surfactant preflush to satisfy the adsorption sites within the formation; (3) the selected foam; and (4) finally the acid slug.

The surfactant preflush places a large amount of surfactant into the higher-permeable zones to stabilize the subsequent foam slug in these zones. The acid slug that follows the foam is thus diverted into the lower-permeable zones where the foam is less stable due to (a) the lower surfactant concentrations (i.e. less injected and more adsorbed) and (b) the higher capillary pressures (less stable foam).

The foam used in this injection sequence should be resistive to both the acid and to the particular residual oil that is in the formation. Also, the "foam mobility reduction" must be from several hundreds to as high as several thousands for the selected foam to effectively divert fluids such as the acid solution; with "foam mobility reduction" being defined as the ratio of the mobility of foam to that of gas at the same gas flow rate and residual oil saturation, determined during gas injection into a surfactant solution while generating the foam. While a foam generated from a single surfactant may yield a mobility reduction up to 100–200 in the absence of crude oil, it usually falls way short when crude oil is present. Further, the foam used must last during the period of acid injection (a typical acid job lasts from 1 to 4 hours) and then collapse, on its own, to facilitate back-flow into the wellbore.

The present invention involves a method for acidizing a subterranean formation having a sequence of steps similar to that described above but one which uses a specially-formulated foam to block flow of the acid into the more permeable zones of the formation during the injection of the acid solution. Basically, each foam formulation in accordance with the present invention is a blend or mixture of a nonionic primary surfactant and a fluorinated cationic co-surfactant aqueous solution that produces a high foam which, in turn, is resistant to acid and crude oil over the length of a typical acidization job in the field.

The mixture of the nonionic surfactant and the fluorinated cationic co-surfactant together form mixed aggregates (micelies) which are positively charged in acid. If necessary, a polymer may be added to enhance the foam mobility reductions. Also, a co-solvent may be used to further stabilize the foam, and to adjust the micellar charge density for optimal surfactant/polymer interaction.

As will be explained in detail below, the nonionic primary surfactant used in the foam of the present invention is preferably selected from the group of alkyl ethoxylated alcohols and alkyl polyglycosides and forms from about 0.1% to about 2% (preferably from about 0.5 to 1.0%) by weight of the surfactant solution. The cationic surfactant fluorinated quaternary ammonium chloride and is used in quantities from 5 to 20 times less that the quantity of the primary surfactant. That is, the co-surfactant has a concentration range from 0.005 to 0.2% by weight in the surfactant mixture. The bulk of the aqueous surfactant solution is water (e.g. a 1–2% ammonium chloride brine).

The polymer, if used, is preferably selected from the group of negatively-charged polysaccharides (e.g. Xanthan gum, Guar gum and their derivatives) and partially hydrolized polyacrylamides with a concentration within the range of about 175 to 1600 ppm (0.0175% to 0.16% by weight) of the surfactant solution. Where a co-solvent is added, any suitable solvent can be used (e.g. isopropyl alcohol, ethanol, methanol, glycerol, ethylene glycol, propylene glycol, triethylene glycol, polyethylene glycol, or combinations thereof) in a concentration of from about 0.5% to about 2% by weight.

In arriving at the present invention, several experiments were conducted to analyze the relative performance of foams generated with various known surfactants and to compare the results of those experiments with foams formed from the surfactant mixtures of the present invention. In each of these experiments, a uniform sample of 7 grams of a particular surfactant solution (1% gross concentration in 15% hydrochloric acid HCl and a 2% ammonium chloride brine) were place with 3 grams of crude oil inside a 25-ml graduated cylinder.

Each sample was pre-heated to the experimental temperature of 150° F. and then capped and sealed with a heat-shrink tape to maintain atmospheric pressure within the cylinder. The samples (a set of four per run) were first slowly tumbled end-over-end for mixing periods of one hour, 4 hours, or 24 hours to fully equilibrate the components in the two liquid phases without foaming the surfactant solution. To produce foam, the samples were then simultaneously and vigorously shaken by a mechanical shaker for 30 seconds at a constant vertical stroke length and RPMs. The initial foam volume and foam decay were recorded with a time-lapse video camera.

Most of the tested, commercially-available surfactants proposed for use in acidizing operations performed poorly in the presence of 15% HCl and crude oil. The following discusses the results of these experiments in more detail.

A. Primary Surfactants

For a surfactant to function as the primary surfactant of the primary surfactant of the present surfactant mixture, it must be capable of making a large volume of foam which will remain active in a strong acid—typically a 15% HCl and/or hydrofluoric acid HF. Several different types of surfactants were tested with the following results:

1. Anionic Surfactants:

Typically, an anionic surfactant such as an alkyl sodium sulfonate (a commercial anionic surfactant) proved to work poorly in the presence of crude oil. A strong acid such as HCl further deteriotated the performance of this type surfactant as the sulfonates became poorly dissociated thereby gaining in further oil-solubility. The foam tests (see curve "M" in FIG. 1) showed that the initial foam height is very low (0.5 ml) and the foam life is very short (1 minute or less).

Adding a few ethylene oxide EO groups to the alkyl chain of an anionic surfactant improved its performance only slightly; i.e. still a low initial foam height (2.5 ml) and a short foam life (2–3 minutes)—see curve "L" in FIG. 1. Compared to the purely anionic surfactants above, this "combination" surfactant ( i.e. anionic and nonionic functionalities) foams better in acid initially but this foam collapses rapidly.

A longer commercially-available, alkyl ethoxylated sulfate $C_{12}EO_4$ sulfate worked better overall—see curve "K" in FIG. 1—producing a medium foam initial height (7.5 ml) and a moderate foam life (10-20 minutes). Initially, the water-solubility due to the EO linkages appears to help produce a good foam, even though the sulfate group may not be dissociated. However, this foam collapses rapidly.

Overall, anionic surfactants were found not to be the best type of surfactant for acid foam because of poor dissociation in HCl; i.e. sulfonic acid is oil-soluble. EO linkages in the chain of "combination" surfactants improves the short-term performance somewhat compared to pure anionics, but long-term performance remains poor, possibly due to acid attack on the sulfate group or other part(s) of the surfactant backbone.

2. Cationic and Amphoteric Surfactants:

A typical commercially-available cationic surfactant, e.g. alkyl ammonium chloride, worked moderately well as a primary surfactant—see curve "I" in FIG. 1—in that it produced a moderate foam height (5.5 ml) and a short foam life (1–2 minutes). Acid protonates the cationic groups and makes the surfactants highly charged, thus improving their brine-solubility. These types of surfactants can therefore be good foamers if there is no oil present.

With oil, however, the positively-charged surfactant can react strongly with the negatively-charged or polar species in the oil to produce water-insoluble complexes that will reside in the oil; thus, the poor foam stability of cationic surfactants in the presence of acid and many crude oils. Note: the fluorinated cationic surfactants will be discussed below in relation to the co-surfactant to be used in the present invention.

Amphoteric surfactants tend to behave the same way in strong acid, but to a lesser extent. The results of the experiments confirmed this behavior in that they produced foams having a good initial foam height (9.5 ml) and good foam life (10–20 minutes)—see curve "C" in FIG. 1.

3. Nonionic Surfactants

A nonionic surfactant with a high hydrophilic-lipophilic balance ("HLB") should provide a better foam in 2% ammonium chloride and 15% HCl than the previous considered surfactants because the functonal group responsible for water-solubility are not strongly affected by acids. The optimal HLB depends on the brine salinity, type of crude oil and temperature.

Figure 2:
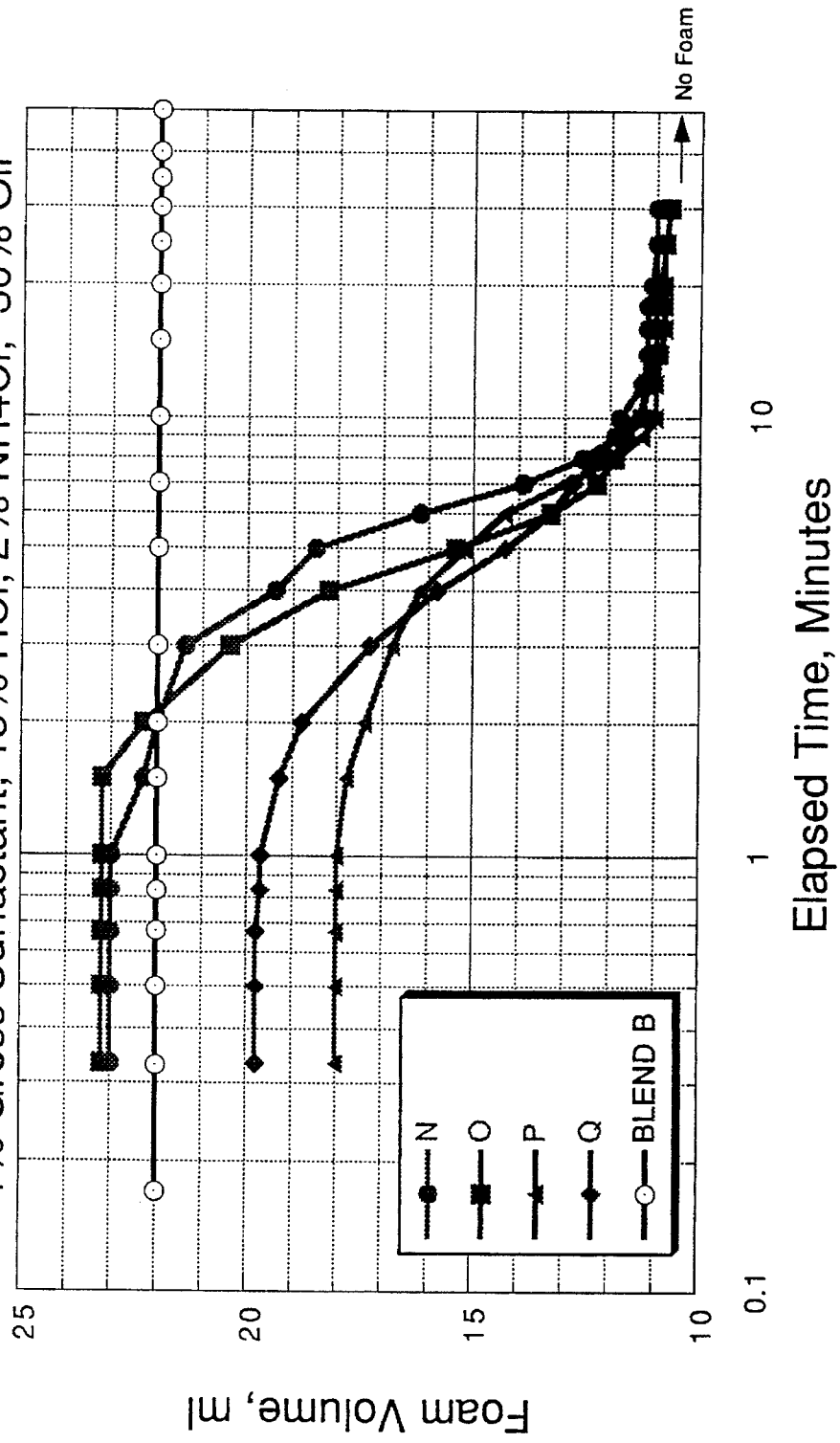
FIG. 2 is a graph showing the foaminess and foam stability of various foams formulated from branched and linear nonionic surfactants and comparing these foams to a foam formulated in accordance with the present invention.
Figure 3:
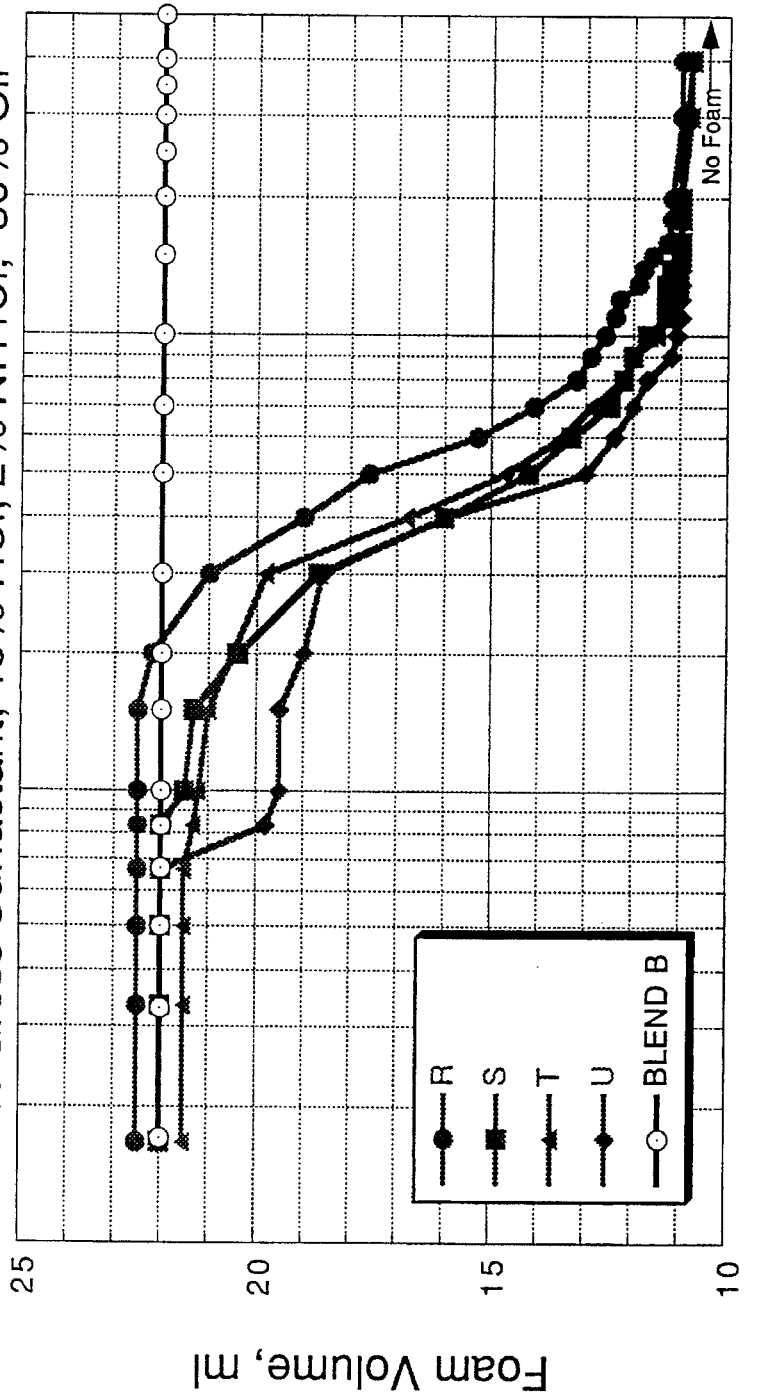
FIG. 3 is a graph showing the foaminess and foam stability of various foams formulated from branched alkyl ethoxylate surfactants and comparing these foams to a foam formulated in accordance with the present invention.

Results from experiments conducted at 150° F. with a particular crude oil (i.e. Saddlerochit crude) revealed that within a HLB range of 14 to 18, the initial foam height is generally more sensitive to the surfactant backbone structure than to the HLB. FIG. 2 compares the effect of the HLB change on branched alkyl ethoxylates $C_{12}EO_x$. As the HLB decreases from 16 1 to 14 (see curves "O" and "N", respectively on FIG. 2), the initial foam height remains essentially unchanged while the foam life improves slightly. With branched $C_{13}EO_x$, the foam initial height increases only slightly from 10.5 to 11.5 ml when the HLB decreases from less than 15.7 to over 18 ( see curves "R" through "U", respectively, in FIG. 3).

At the same time, the foam life increases from 10 minutes to about 20 minutes. Likewise, all linear $C_9OEO_x$ (see curves "W", "X" and "Y" on FIG. 4) yielded about the same initial foam heights (i.e. from 8.5 to 9 ml) regardless of their HLB's (i.e. 15 to 17.2, respectively). Further, the ultimate foam life with these linear $C_9OEO_x$ decreased roughly from 20 to 10 minutes as the HLB increases. This trend has been observed with ionic surfactants where the increase in hydrophilicity reduces the foam stability.

In contrast, two surfactants with similar HLB's can have significantly different initial foam heights depending on their structures. For example, as the backbone changes from linear $C_{12}EO_x$ without a ring and a HLB of 16.9 (see curve "P" in FIG. 2) to a linear $C_9OEO_x$ with a ring and a similar HLB of 17.2 (see curve "Q" in FIG. 2), the foam initial height improved from 7 ml to about 9 ml at about the same HLB. Similarly, the branched $C_{12}EO_x$ having a HLB of 16.1 (see curve "V" in FIG. 4) has a significantly higher foam initially (i.e. 12 ml) than the height (i.e. 8.5 ml) of $C_9OEO_x$ (see curve "X" in FIG. 4).

As a first rule, the surfactant alkyl chain or tail should contain fewer than 14 carbons to minimize solubility in oil.

A hydrocarbon tail containing 12 to 13 carbon atoms (benzene ring equivalent to 3.5 carbons) is preferred for use at 75° to 200° F., with 15% HCl, 2% ammonium chloride brine and most crude oils.

Second, the surfactant tail should also preferably be branched. Branching sterically hinders the micellization—i.e. the packing of the branched "tail" within the curved interface of a micelle—more than the aggregation at the planar gas-water interface. Consequently, the surface tension, which depends on the monomer density at the gas-water interface, can reach a lower value with the higher surfactant density. This lower tension reduces the energy needed to foam, leading to higher foam height initially.

Third, for a given brine/HCl/oil system and a temperature, a range of HLB between 12 to 20 is suitable; the preferred range for most acid, brine, and temperature is 14 to 16. The lower end of the HLB range yields slightly more foam initially and a longer foam life than the higher end.

Finally, the overall concentration of this primary surfactant in the final surfactant solution must be large enough to ensure low dynamic surface tensions during foam generation. For most surfactants, a concentration range of from about 0.25% to about 2%, by weight, is suitable, with the preferred range being from about 0.5 wt % to about 1 wt %.

The results of the experiments support these concentrations. For example, 1 wt % of a branched alkyl ethoxylated alcohol of the type $C_{12}EO_x$ (see curves "N" and "O" in FIG. 2) or $C_{13}EO_x$ (curves "R" and "S" in FIG. 3) with an HLB between 14 and 16 yielded by far the most foam initially (about 12 ml vs. 9 ml or less for other surfactants) and as good a foam life (about 10–20 minutes) as any other single surfactant.

Alkyl polyglycosides ("APG") with an HLB of 13.6 (curve "E" in FIG. 1) yielded about the same amount of initial foam volume and foam life as a linear alkyl ethoxylated alcohol (curve "G" in FIG. 1) after one hour of equilibration time; these being the primary surfactants selected for use in the surfactant solution of the present invention.. Surprisingly, a slightly lower HLB of 13.1 (curve "D" in FIG. 1) appears to perform much better. Also, the HLB of the best APG appears relatively low, compared to that of the alkyl ethoxylates, suggesting the dominant role of structure. So, simple tests may be conducted for a specific system to ensure selection of the optimal surfactant to be used in a particular application.

The APG surfactant appeared to decompose after a long contact time with 15% HCl (i.e. 24 hours), thus losing most of its foam stability (see FIG. 5). Therefore, for a short acid job (i.e. 4 hours or less) at a low temperature, this surfactant may be a better choice than an alkyl ethoxylated alcohol which can leave a very strong foam to interfere with the clean-up procedure. The APG's also have a lower toxicity than the alkyl ethoxylated alcohols, and biodegrade much more quickly.

To summarize, the primary surfactant used for forming the present surfactant solution is a nonionic surfactant selected from the group of alkyl ethoxylated alcohol and alkyl polyglycosides and is present in the concentration range from about 0.25% to 2%, by weight.

B. Co-Surfactants

In the present invention, the co-surfactant is a fluronated cationic surfactant which performs two important functions: (1) to increase foam stability in the present of crude oil and, (2) if a polymer (to be discussed below) is added, to improve foam mobility reduction through interaction with the polymer. The fluorinated cationic co-surfactant (i.e. fluorinated quaternary ammonium chloride) of the present invention works moderately well by itself (curve "J" in FIG. 1) producing a low initial foam height (i.e. 2.5 ml) but a very long foam life (>60 minutes although the foam bubbles are extremely thin) in the presence of a crude oil. HCl protonates these fluorinated cationic surfactants.

However, the fluorocarbon moiety dramatically reduces the oil solubility and provides much lower surface tensions than the alkyl chain. Thus, while the initial foam height is low because of partial surfactant loss in oil, this foam is long lasting because of the ultra-low surface tension, which promotes lamella stability in the presence of crude oil. Increasing the surfactant concentration from 1 wt % (curve "J" of FIG. 1) to 1.75 wt % (curve "H") increases the foam initial height. Unfortunately, however, the cost of using this much flurocarbon surfactant is prohibitive in acidizing operations. Therefore, the flurocarbon surfactants are more optimally used as co-surfactants at much lower concentrations to provide oil stability and long life to the less-expensive, primary surfactants.

When a polymer is used in the present surfactant solution, the hydrophilic moiety, or head, of the co-surfactant must be cationic in order to interact with the polymer. This cationic surfactant will form mixed micelles with the primary nonionic surfactant. The cationic heads of the co-surfactant provide surface charges to the micelles, which are attracted to the oppositely charged segments of the polymer chain.

The micellar charge density may be adjusted by varying the ratio of nonionic to cationic surfactant NI/CI in the bulk to induce interaction with polymer in 2% ammonium chloride brine and 15% HCl. Zwitterionic surfactant may also be used, although the electrical interactions with the polymer may be weaker and less predictable.

Without any polymer being added, a weight ratio of nonionic to cationic surfactant of from 5-1 to about 20-1 (i.e. from about 0.0125 wt % to about 0.4 wt % of the gross surfactant solution) is suitable, depending on the level of oil saturation with higher saturations requiring more co-surfactant (i.e. fluorocarbon). The preferred ratio of primary surfactant to co-surfactant is about 10 to 1 (from about 0.025 wt % to about 0.2 wt %).

When a polymer is added, the ratio of NI/CI is used to adjust the micelle surface charge density and control the surfactant-polymer interactions. For a fixed level of cationic/nonionic surfactant and polymer, the maximum NI/CI ratio may be determined experimentally by increasing the proportion of cationic suractant until the surfactant/polymer complex is formed and precipitated out of solution. This establishes the highest NI/CI ratio. A NI/CI ratio of 10 to 1 is a good starting point for generating foams for most acidizing operations. Conversely, for a fixed polymer level and NI/CI ratio, the appropriate surfactant level may be determined by adding an increasing amount of the surfactnat mixture which has a fixed NI/CI. In both cases, excess surfactant, polymer, or an addition of a co-solvent (discussed below) can resolubilize the complex into the aqueous solution.

C. Polymer

Most foams generated from surfactants alone can yield a mobility reduction up to a few hundred fold. To reach a higher mobility reduction and better vertical conformance for the acid, a polymer must be added. Many natural and synthetic polymers carry nonionic functional groups and negative electrical charges that can interact with positively charged micelles to form aggregates. The polymers should have a molecular weight between 1 and 5 million to provide both high viscosity and good injectively. The nonionic functional groups provide water solubility without extreme sensitivity to pH changes.

Negatively-charged polysaccharides (e.g. Xanthan gum, guar gum and its derivatives), and partially hydrolyzed polyacrylamides may be used with micelles with a slight positive charge (cationic flurocarbon-nonionic hydrocarbon surfactant). The polymer concentration depends on the level of mobility reduction required. A range of from about 175 to about 1600 ppm polymer (i.e. from about 0.0175 wt % to about 0.16 wt %) is recommended. The optimal range depends on the level of mobility reduction desired.

D. Co-Solvent

An excess of surfactant or polymer maintains the surfactant/polymer complex in solution. However, a less expensive approach is to use a weak amphiphile as a co-solvent to solubilize the complexes. Suitable co-solvents can be selected from the group of isopropyl alcohol, ethanol, methanol, glycerol, ethylene glycol, propylene glycol, triethylene glycol, polyethylene glycol, or combinations thereof. The co-solvent may be used to disperse the polymer as slurry, which facilitate subsequent dissolution and hydration in water and reduces the chance of making "fish eyes".

The co-solvent also stabilizes foam, and reduces the freezing point of the foaming solution. A concentration range of 0.5 to 2%, by weight, is recommended.

The following specific examples describes foams which were formulated in accordance with the present invention for use in particular applications; i.e. foams which are stable in the presence of 15% HCl, 2% ammonium chloride, and 30% Saddlerochit crude oil:

1. Foam Formulation with Branched Alkyl Ethoxylate

A branched nonionic surfactant ("TERGITOL TMN 10" or Trimethyl nonylpolyethyleneglycol ether, branched $C_{12}EO_{10}$, manufactured by Union Carbide) having a HLB of 16.1 was selected as the primary surfactant in a gross weight concentration of 0.1%. A gross concentration of 0.5 wt % is near the optimum for foam initial height and foam life.

A concentration of 0.05 wt % of gross cationic co-surfactant (i.e. a fluorinated quaternary ammonium chloride such as "FLUORAD FC-754", manufactured by 3-M Company) was mixed with the primary surfactant and the brine to form the surfactant solution. The resulting formulation (curve "Blend B" in FIG. 2) yielded a foam about as high as that of a foam using the primary surfactant alone (curve "O" in FIG. 2) but it extended the foam life in the present of crude oil at 150° F. from 10 minutes to several hours (compare curves "Blend B" and "O" in FIG. 2).

With or without a polymer, a co-solvent (e.g. polyol) may be added within the range of from about 0.65 wt % to about 2 wt %. Mixing varying amounts of the co-surfactant with a fixed amount of the primary surfactant formed charged mixed-micelles. A fixed amount of polymer established the co-surfactant concentration at which the surfactant/polymer complex precipitates for a given brine/temperature system. This is the maximum concentration of a co-surfactant which to be used with a particular concentration of a polymer.

A surfactant solution in accordance with the present invention was formulated which was comprised of 0.45 wt % gross primary surfactant ("TMN 10"), 0.05 wt % gross co-surfactant ("FC-754"), and 0.65 wt % polyol (glycerol)—a total of 1.15 wt % gross chemicals with the remainder of the aqueous surfactant solution comprising a 2% ammonium chloride brine—produced an excellent foam; (i.e. "Blend B" in FIG. 6). When the equilibration time was extended from 1 hour to 24 hours to simulate the end of a long acid job, this formulation still produced high initial foam and retained a foam life exceeding 100 minutes (FIG. 6). Such formulations appear highly useful in high-temperature acid jobs.

2. Foam Formulated with Polyglycosides

A surfactant solution was formulated in accordance with the present invention using an mixture of alkyl polyglycosides APG ( i.e. APG 300 $C_nH_{2n+1}O(C_6H_{10}O_5O_xH$ wherein n=9 to 11; x=1.8 and APG 225 n=8 to 10; x=1.4, both manufactured by Henkel) which produced a HLB of about 13, comparable to an HLB of 13.1 for APG325, which was tested alone. Blending 0.35 wt % gross of this APG mixture with 0.05 wt % of gross co-surfactant (i.e. "FLUORAD FC-754") and 0.85 wt % polyol (i.e. glycerol)—a total of 1.25 wt % gross chemicals with the remainder of the aqueous surfactant solution comprising a 2% ammonium chloride brine)—produced an excellent foam; "Blend A" in FIG. 5. This formulation produced a similar foam initial height and foam life (beyond 4 hours) as the did "Blend B" in FIG. 6. However, "Blend A" lost nearly all of its effectiveness after 24 hours of contact with acid (FIG. 5). This weaker foam helps the backflow of chemicals in short acid jobs at low temperatures.

In order to increase the foam mobility reduction, an anionic polymer (e.g. a polysaccharide having a molecular weight of about 4 million such as "FLOCON 4800C" Xanthan gum, manufactured by Pfizer) may be added to either the surfactant solution formulated with an alkyl ethoxylate or the surfactant solution formulated with polyglycosides. The polymer may be added in amounts of from about 175 to about 500 ppm to provide the high mobility reduction needed at the above surfactant concentrations of from about 0.35 wt % to about 0.45 wt %. If necessary, the polymer concentration may be further increased by increasing the concentration of surfactant/co-surfactant/co-solvent proportionally.

What is claimed is:

1. A method for acidizing a subterranean formation comprising:

injecting a foam into said formation to block flow through the higher-permeable zones of the formation, said foam being generated from a surfactant solution comprised of a nonionic primary surfactant and a cationic co-surfactant; and injecting an acid into said formation after said foam has been injected into said formation.

2. The method of claim 1 wherein said nonionic primary surfactant is selected from the group of alkyl ethoxylated alcohols and alkyl polyglycosides.

3. The method of claim 2 wherein said cationic co-surfactant is quaternary ammonium chloride.

4. The method of claim 3 wherein the concentration of said nonionic primary surfactant in said surfactant solution is within the range of from about 0.1% to about 2%, by weight.

5. The method of claim 4 wherein the concentration of said cationic co-surfactant in said surfactant solution is from about 5 to about 20 times less the concentration of said nonionic primary surfactant.

6. The method of claim 5 wherein said surfactant solution includes:

a polymer selected from the group of negatively-charged polysaccharides and partially hydrolized polyacrylamides.

7. The method of claim 1, wherein polysaccharides is selected from the group of xanthan gum, guar gum and their derivatives.

8. The method of claim 6 wherein the concentration of said polymer in said surfactant solution is from about 175 to about 1600 ppm.

9. The method of claim 8 wherein said surfactant solution includes:

a co-solvent selected from the group of isopropyl alcohol, ethanol, methanol, glycerol, ethylene glycol, propylene glycol, triethylene glycol, polyethylene glycol, or combinations thereof in a concentration of from about 0.5% to about 2% by weight.

10. The method of claim 9 wherein said surfactant solution includes:

a 2 wt % ammonium chloride brine.

* * * * *